Dec. 5, 1967   F. E. GRUBER   3,356,405
FOOD TONG
Filed Oct. 18, 1965
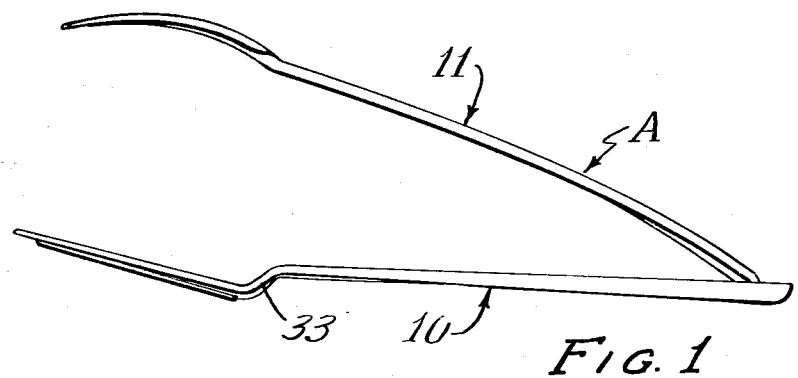
FIG. 1
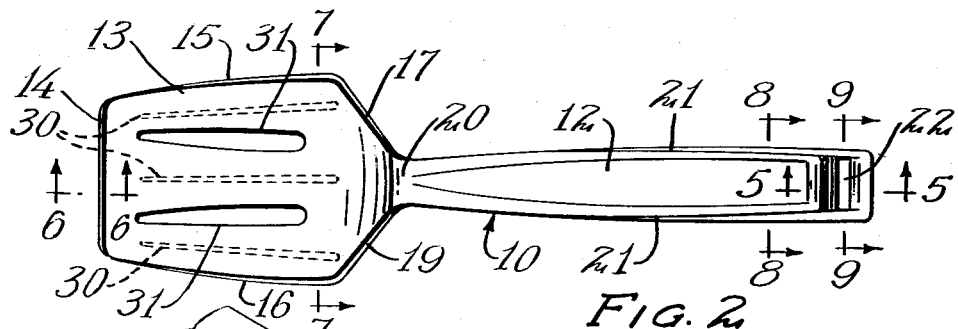
FIG. 2
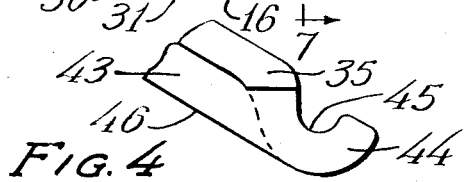
FIG. 4
FIG. 6
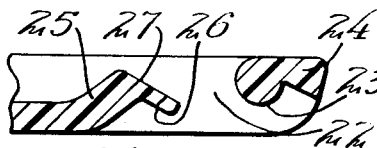
FIG. 5
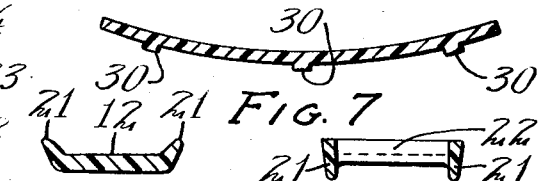
FIG. 7   FIG. 8   FIG. 9
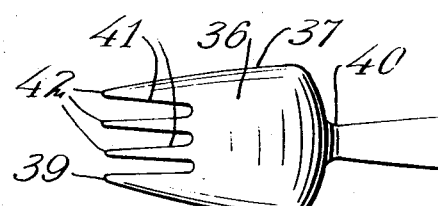
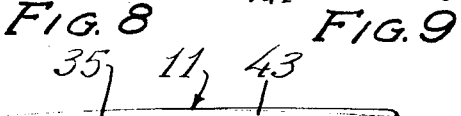
FIG. 3
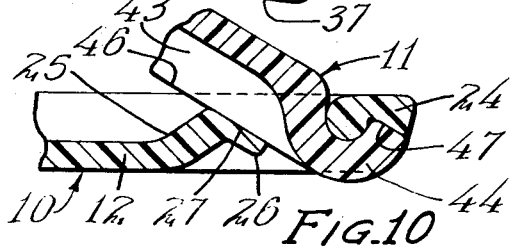
FIG. 10
INVENTOR
FRANCIS E. GRUBER
BY
ATTORNEY

United States Patent Office 3,356,405
Patented Dec. 5, 1967

3,356,405
FOOD TONG
Francis E. Gruber, St. Paul, Minn., assignor to Northwest Plastics, Inc., St. Paul, Minn., a corporation of Minnesota
Filed Oct. 18, 1965, Ser. No. 497,142
1 Claim. (Cl. 294—3)

This invention relates to an improvement in food tongs and deals particularly with tongs of the type used in serving salad, meat, and the like.

Serving tongs usually comprise a pair of lever arms which are hingedly connected at one end and which are formed in the shape of forks, spoons, or the like at the other end. A spring is usually provided normally urging the tongs apart. The free ends of the tongs are usually held in a desired position by engagement of the tongs between the thumb and fingers.

The object of the present invention is to provide an improved tongs construction in which the tongs include a pair of members which are detachably connected together and which are formed of resilient plastic. When connected together, the two arms are normally maintained with their free ends in spaced relation. By applying pressure to the arms intermediate the ends thereof, the free ends of the arms may be sprung together to engage material positioned between the free ends of the jaws. As soon as the pressure is released, the ends of the tongs will spring apart to disengage the object held.

A further feature of the present invention resides in the provision of a pair of tong levers, one of which is shaped to provide a spoon having a flat end which may be used as a scraper blade or spatula, and the other of which is shaped somewhat similarly to a fork. If desired, the two tong arms may be used separately where such use is more practical.

An added feature of the present invention resides in the provision of a pair of tong levers, one of which is slotted to provide spaced tines similar to those of a fork, and the other of which is provided with a flat end. When the two long levers are secured together to provide a tong's construction, and the arms are flexed so that the ends of the arms are in engagement, the tines of the fork-like lever terminate short of the end of the other tong lever so that this other lever may be used as a scraper blade even when the two levers are rigidly connected.

A further feature of the present invention lies in the provision of a pair of tongs made of a plastic which is somewhat resilient and which therefore will not mar the surfaces of plates, dishes, pans or even Teflon coated pots and pans. At the same time, the tongs may be readily cleaned and sterilized.

These and other objects and novel features of the present invention will be more clearly and fully set forth in the following specification and claim.

In the drawings forming a part of the specification:

FIGURE 1 is a side elevational view of a pair of tongs, showing the construction thereof.

FIGURE 2 is a top-plan view of one of the tong levers.

FIGURE 3 is a plan view of the other tong lever.

FIGURE 4 is an enlarged side elevational view of the end of the tong lever shown in FIGURE 3.

FIGURE 5 is an enlarged vertical sectional detail through an end of the other tong lever, the position of the section being indicated by the line 5—5 of FIGURE 2.

FIGURE 6 is a sectional view through the end of one of the tong levers, the position of the section being indicated by the line 6—6 of FIGURE 2.

FIGURE 7 is a transverse sectional view through the same tong lever, the position of the section being indicated by the line 7—7 of FIGURE 2.

FIGURE 8 is a transverse sectional view through the handle end of the same tong lever, the position of the section being indicated by the line 8—8 of FIGURE 2.

FIGURE 9 is a second transverse sectional view through the handle end of the same tong lever, the position of the section being indicated by the line 9—9 of FIGURE 2.

FIGURE 10 is an enlarged sectional view through the pivotally connected ends of the two levers.

The tongs A include a first tong lever which is indicated in general by the numeral 10, and a second tong lever which is indicated in general by the numeral 11. The two tong levers are hingedly connected together in a manner which will be described, and when connected normally diverge apart as indicated in FIGURE 1 of the drawings. The material forming the tong levers is nylon or another suitable plastic material which is sufficiently resilient to permit the free ends of the tong levers to swing into contact when the levers are drawn together.

The tong lever 10 is shown in plan in FIGURE 2 of the drawings. This lever is designed to provide a spoon-like spatula and includes a handle end 12 and a spatula end 13. The forward or free end of the spatula end 13 is substantially straight as indicated at 14 and at right angles to the longitudinal axis of the lever. The side edges 15 and 16 diverge apart slightly from the blunt forward end 14, and then converge inwardly as indicated at 17 and 19 from the widest point of the spatula head 13 to the forward end 20 of the handle 12.

The handle 12 is trough-shaped or channel-shaped in cross-section as indicated in FIGURE 8 of the drawings, the edges of the handle being ribbed as indicated at 21. A transversely extending aperture 22 extends through the handle 12 near the end extremity thereof. The transverse portion of the handle between the aperture 22 and the end of the handle is formed as best illustrated in FIGURE 5 of the drawings. This handle portion includes a cylindrical surface 23 which faces forwardly on the lever and which is interrupted by a rearwardly extending lip 24 extending to the rear end of the tong lever.

The edge of the aperture 22 which is most remote from the handle extremity of the tong lever 10 includes an upwardly and rearwardly extending flange portion 25, and a rearwardly and downwardly inclined terminal flange 26 connected to the flange 25. The upper surface 27 of the flange 26 lies on a plane which is parallel to, and spaced from, a radial plane through and including the axis of a cylindrical surface 23. This arrangement is provided so that the undersurface of the tong lever 11 may rest upon the surface 27 of the flange 26 when the two levers are engaged, as is indicated in FIGURE 10 of the drawings.

The spatula end 13 has an upper surface which is slightly concave at the widest portion of the spatula end, as is indicated in FIGURE 7 of the drawings. The spatula end 13 becomes less and less concave as it approaches the forward end 14, and is flat along this forward end so that the lever may be used for scraping purposes. Spaced longitudinally extending reinforcing ribs 30 are provided on the undersurface of the spatula end 13 to stiffen the blade.

The spatula end 13 is provided with a pair of longitudinally elongated slots 31 extending therethrough, these slots 31 being located intermediate the central reinforcing rib and the two outer reinforcing ribs 30. These slots terminate short of the ends of the sptaula end 13 as is best indicated in FIGURE 2 of the drawings.

As indicated in FIGURE 1 of the drawings, the portion of the spatula end between the converging edges 17 and 19 and adjoining the end 20 of the handle 12 is downwardly offset as indicated at 33. The remainder of the spatula head is inclined upwardly from the offset portion 33 so that the blunt end 14 of the spatula head is well above the plane of the upper surface of the handle end 12. This arrangement is to facilitate the grasping of food between the tong levers. As is indicated in FIGURE 6 of the drawings, the blunt end portion 14 is inclined downwardly slightly relative to the undersurface 34 of the spatula end to facilitate the scraping of flat surfaces with the spatula end.

The tong lever 11 includes an elongated handle end 35 and a head end 36. The head end 36 is shown in FIGURE 3 in inverted position relative to its position shown in FIGURE 1. The side edges 37 of the head end 36 taper from the forward extremity 39 thereof toward the rear end thereof, the head being centered with respect to the relatively narrow forward extremity 40 of the handle 35. The undersurface of the head 36 as viewed in FIGURE 1 or upper surface thereof as viewed in FIGURE 3 is somewhat concave and the forward end of the head 36 is serrated as indicated at 41 to provide a series of tines 42.

The handle end 35 is generally channel-shaped in cross-section, being provided with a pair of upstanding reinforcing ribs 43 along opposite edges thereof somewhat similar to the rib edges 21 of the tong lever 12. As indicated in FIGURE 4 of the drawings, the handle extremity is provided with a hook-shaped projection 44 which is of proper width to extend through the slot 22 in the lever 10. The hook-shaped projection 44 is provided with a partially cylindrical surface 45 which is of approximately the same radius as the cylindrical surface of the projection 23. The undersurfaces 46 of the reinforcing ribs 43 are on a plane parallel to a plane through and including the axis of the cylindrical surface 45. FIGURE 10 of the drawings shows the two tong levers in inter-engaged position. In this position, the end extremity 47 of the hook-shaped projection 44, which is substantially flush with the upper surface of the handle end 35, is in face contact with the undersurface of the rearwardly projecting lip 24, and the undersurfaces 46 of the ribs 43 are in engagement with the cooperable surface 27 of the flange 26. This inter-engagement between the two levers limits the pivotal movement of the tong levers 10 and 11 toward one another to the diverging relationship indicated in FIGURE 1 of the drawings. The reinforcing rib 43 of the tong lever 11 extend from the end extremity of the handle 35 slightly more than one-half the length of the handle 36 so that the end portion of the handle connected to the head 36 is relatively flexible. Accordingly, when the tong levers are grasped between the thumb and fingers, the two levers will flex toward one another, the lever 11 flexing to a greater extent than the lever 10. As a result, when the end extremity 42 of the lever 11 is in engagement with the upper surface of the spatula end 13, the end 14 of the spatula head 13 will project well beyond the end extremity 39 of the tines 42 to permit the tongs to be used for scraping purposes when combined. Obviously, food may be grasped between the head ends of the tong levers 10 and 11 when the tongs are used for serving.

In the foregoing description, the term "upper surface," "lower surface," "upward direction," and "downward direction," have been used to correspond with the relationship of the tongs illustrated in FIGURE 1. Obviously, this terminology is used solely for the purpose of description, and as the tongs are most commonly used with the tong lever 10 somewhat below the tong lever 11 when the spatula head 13 is used for scraping purposes.

In accordance with the patent statutes, I have described the principles of construction and operation of my improvement in food tongs, and while I have endeavored to set forth the best embodiment thereof, I desire to have it understood that changes may be made within the scope of the following claim without departing from the spirit of my invention.

I claim:

Food tongs including:
   a pair of tong levers having handle ends and opposite ends,
   the handle end of one of said tong levers being channel-shaped in cross-section having ribbed edges and a base portion therebetween,
   said base portion having a transversely extending aperture therethrough near the handle end extremity,
   the end extremity of said handle end having a partial cylindrical projection along the edge of said aperture interrupted by a rearwardly extending lip which connects said ribs and forms the rearward end extremity of said handle end,
   the opposite or forward side of said aperture being defined by a downwardly and rearwardly inclined flange, the plane of which lies below said cylindrical projection and at an acute angle to the base of the channel-shaped portion,
   the other tong member having a handle end portion of inverted channel-shaped cross-section including downwardly projecting ribs along opposite side edges,
   a hook-shaped projection forming the end extremity of said handle end of said other tong member,
   said hook-shaped projection being of a width substantially equal to the width of said aperture and having a substantially semi-cylindrical upper surface having a radius substantially equal to the radius of said partially cylindrical projection and terminating in an end on a plane substantially flush wtih the upper surface of the handle end of said other tong member,
   said hook-shaped projection being detachably engageable with said partial cylindrical projection with said end extremity of said hook-shaped projection engaged against said lip and with the ribs of said handle end portion of said other tong member resting flush against the surface of said rearwardly inclined flange.

References Cited

UNITED STATES PATENTS 2,670,234  2/1954  Roop _____ 294—99

FOREIGN PATENTS 1,093,186  11/1954  France.
1,116,359  11/1961  Germany.

GERALD M. FORLENZA, *Primary Examiner.*

GEORGE F. ABRAHAM, *Assistant Examiner.*